(12) United States Patent
Sato

(10) Patent No.: US 10,894,539 B2
(45) Date of Patent: Jan. 19, 2021

(54) HYBRID VEHICLE

(71) Applicant: Toyota Jidosha Kabushiki Kaisha, Toyota (JP)

(72) Inventor: Keita Sato, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 253 days.

(21) Appl. No.: 16/197,994

(22) Filed: Nov. 21, 2018

(65) Prior Publication Data

US 2019/0161075 A1 May 30, 2019

(30) Foreign Application Priority Data

Nov. 27, 2017 (JP) .................................. 2017-226935

(51) Int. Cl.
*B60W 20/40* (2016.01)
*B60W 10/26* (2006.01)

(52) U.S. Cl.
CPC ............ *B60W 20/40* (2013.01); *B60W 10/26* (2013.01); *B60W 2510/06* (2013.01); *B60W 2510/244* (2013.01); *B60W 2510/246* (2013.01); *B60W 2710/242* (2013.01); *B60Y 2200/92* (2013.01)

(58) Field of Classification Search
CPC .............. B60W 20/40; B60W 10/26; B60W 2710/242; B60W 2510/246; B60W 2510/244; B60W 2510/06; B60W 2050/0088; B60W 2050/0008; B60W 50/0098; B60W 20/13; B60Y 2200/92; Y02T 10/62; B60K 6/445

USPC ........................................................ 701/22
See application file for complete search history.

(56) References Cited

U.S. PATENT DOCUMENTS

| 2010/0071975 A1* | 3/2010 | Aoki | ...................... B60W 10/06 |
| | | | 180/65.285 |
| 2014/0028032 A1* | 1/2014 | Kaita | ...................... B60W 20/40 |
| | | | 290/38 R |

FOREIGN PATENT DOCUMENTS

| JP | 2006296183 A | 10/2006 |
| JP | 2009107555 A | 5/2009 |
| JP | 2015051707 A | 3/2015 |

* cited by examiner

*Primary Examiner* — Nadeem Odeh
(74) *Attorney, Agent, or Firm* — Dinsmore & Shohl LLP

(57) ABSTRACT

A hybrid vehicle starts execution of temporary increase control that temporarily increases an allowable discharge power that is a maximum power dischargeable from a power storage device, on satisfaction of a predetermined start condition, and terminates execution of the temporary increase control on satisfaction of a predetermined termination condition. When a predetermined stop condition that is different from the predetermined termination condition is satisfied during execution of the temporary increase control, the hybrid vehicle terminates execution of the temporary increase control and prohibits subsequent execution of the temporary increase control until elapse of a first predetermined time. This configuration suppresses frequent repetition of a temporary increase of the allowable discharge power (output limit) of the power storage device such as a battery and its cancellation.

10 Claims, 4 Drawing Sheets

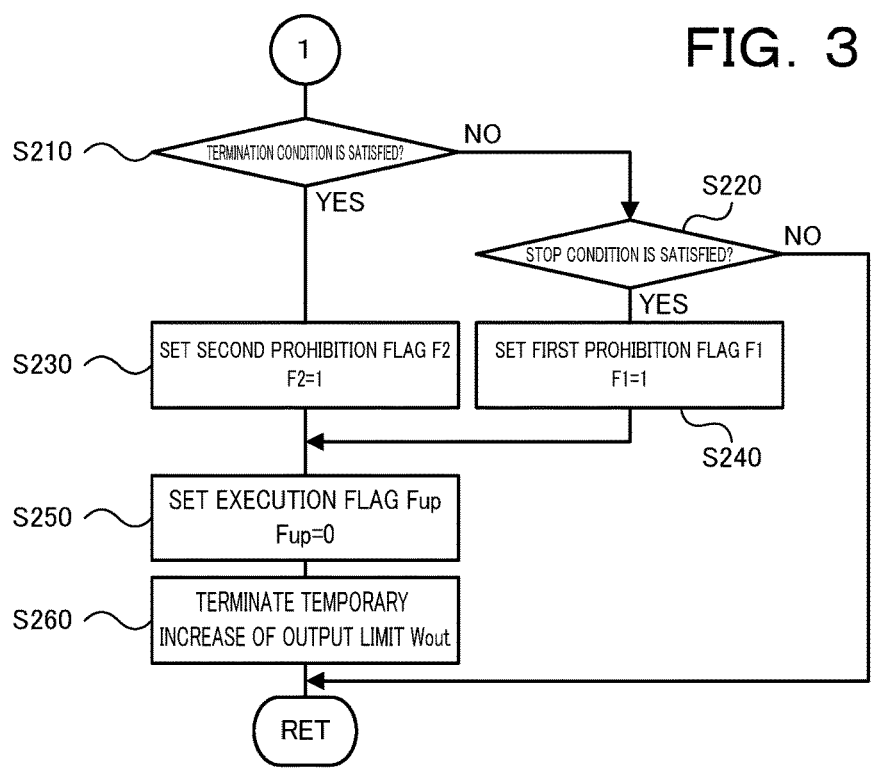
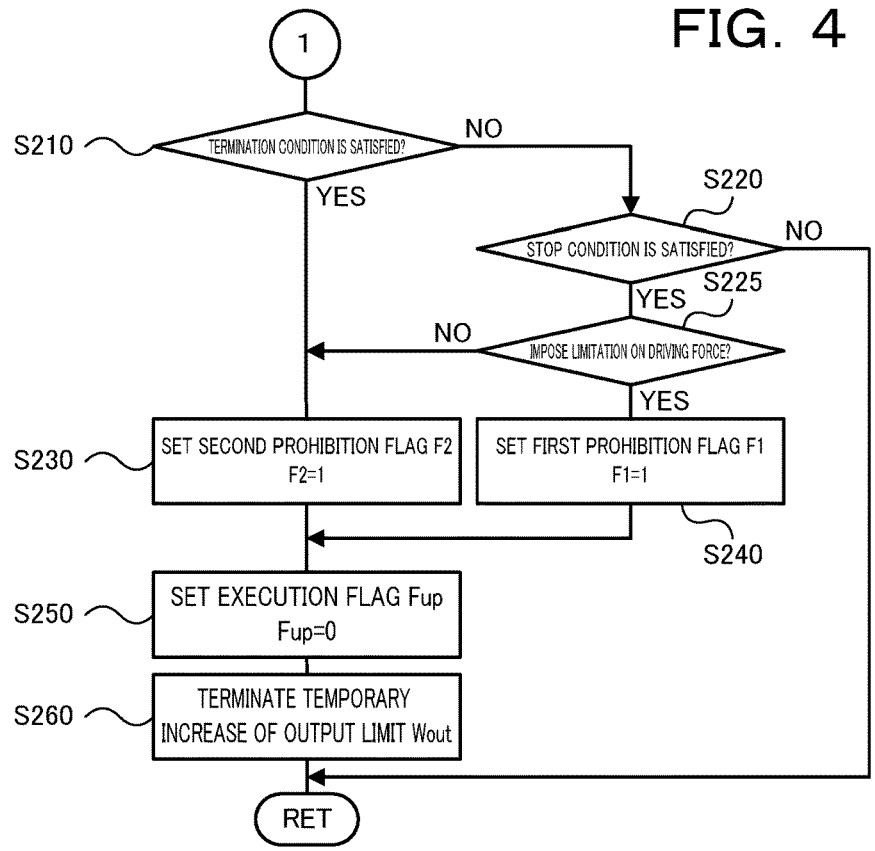

HYBRID VEHICLE

CROSS-REFERENCE TO RELATED APPLICATIONS

The present disclosure claims priority to Japanese Patent Application No. 2017-226935 filed Nov. 27, 2017, which is incorporated herein by reference in its entirety including specification, drawings and claims.

TECHNICAL FIELD

The present disclosure relates to a hybrid vehicle.

BACKGROUND

A proposed configuration of a hybrid vehicle temporarily increases an output limit that may be output from a battery (i.e., allowable discharge power that is a maximum power dischargeable from the battery) at the time of starting an engine (as described in, for example, JP 2009-107555A). This hybrid vehicle suppresses power shortage at the time of starting the engine by temporarily increasing the output limit of the battery.

SUMMARY

When the voltage of the battery decreases or when the remaining charge (state of charge) of the battery decreases during a temporary increase of the output limit of the battery, the hybrid vehicle described above cancels the temporary increase of the output limit. When the engine is restarted in this state, the output limit of the battery is temporarily increased, and this temporary increase of the output limit is cancelled immediately. This causes frequent repetition of the temporary increase of the output limit and its cancellation and thereby provides poor drivability.

A hybrid vehicle of the present disclosure mainly aims to suppress frequent repetition of a temporary increase of an allowable discharge power (output limit), of a battery and its cancellation.

In order to achieve the above primary object, the hybrid vehicle of the present disclosure employs the following configuration.

The present disclosure is directed to a hybrid vehicle. The hybrid vehicle includes an engine configured to output power for driving, a motor configured to output power for driving, a power storage device configured to transmit electric power to and from the motor and a control device configured to start execution of temporary increase control that temporarily increases an allowable discharge power, which is a maximum power dischargeable from the power storage device, on satisfaction of a predetermined start condition and to terminate execution of the temporary increase control on satisfaction of a predetermined termination condition. On satisfaction of a predetermined stop condition that is different from the predetermined termination condition, during execution of the temporary increase control, the control device terminates execution of the temporary increase control and prohibits subsequent execution of the temporary increase control until elapse of a first predetermined time.

The hybrid vehicle of this aspect starts the temporary increase control that temporarily increases the allowable discharge power (output limit) that is the maximum power dischargeable from the power storage device, on satisfaction of the predetermined start condition, and terminates the temporary increase control on satisfaction of the predetermined termination condition. When the predetermined stop condition that is different from the predetermined termination condition (ordinary termination condition) during execution of the temporary increase control, the hybrid vehicle terminates execution of the temporary increase control and prohibits subsequent execution of the temporary increase control until elapse of the first predetermined time. In other words, when execution of the temporary increase control is terminated on satisfaction of the predetermined stop condition that is different from the predetermined termination condition (ordinary termination condition), subsequent execution of the temporary increase control is prohibited even when the predetermined start condition is satisfied before elapse of the first predetermined time. This configuration suppresses frequent repetition of a temporary increase of the allowable discharge power (output limit) of the power storage device such as a battery and its cancellation.

BRIEF DESCRIPTION OF DRAWINGS

FIG. 3 is a flowchart showing a remaining part of the example of the temporary increase control routine performed by the HVECU;

FIG. 4 is a flowchart showing part of another example of the temporary increase control routine according to a modification;

DESCRIPTION OF EMBODIMENTS

The following describes some aspects of the disclosure with reference to embodiments.

Figure 1:
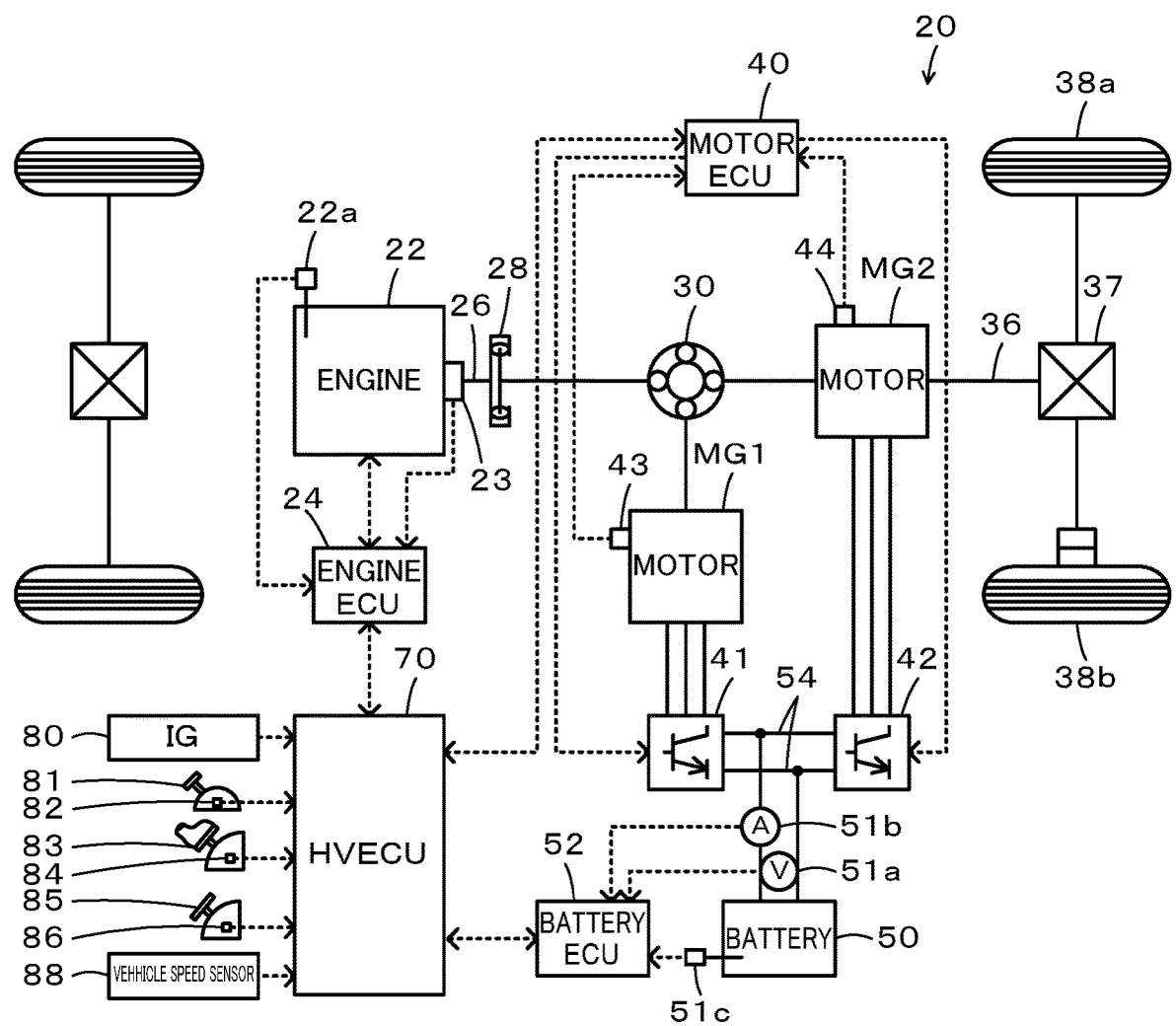
FIG. 1 is a configuration diagram illustrating the schematic configuration of a hybrid vehicle according to an embodiment of the present disclosure.

FIG. 1 is a configuration diagram illustrating the schematic configuration of a hybrid vehicle 20 according to an embodiment of the present disclosure. As illustrated, the hybrid vehicle 20 of the embodiment includes an engine 22, a planetary gear 30, motors MG1 and MG2, inverters 41 and 42, a battery 50, and a hybrid electronic control unit (hereinafter, referred to as "HVECU") 70.

The engine 22 is configured as an internal combustion engine to output power using, for example, gasoline or light oil as a fuel. The engine 22 is operated and controlled by an engine electronic control unit (hereinafter referred to as "engine ECU") 24.

The engine ECU 24 is configured as a CPU-based microprocessor and includes a ROM configured to store processing programs, a RAM configured to temporarily store data, input/output ports and a communication port, in addition to the CPU, although not being illustrated. Signals from various sensors required for operation control of the engine 22 are input into the engine ECU 24 via the input port. The signals input into the engine ECU 24 include an intake air temperature Ta from a temperature sensor 22a configured to detect the temperature of the intake air of the engine 22, a crank angle θcr from a crank position sensor 23 configured to detect the rotational position of a crankshaft 26 of the engine 22, and a throttle position TH from a throttle valve position sensor configured to detect the position of a throttle valve, in addition to a variety of other signals.

Various control signals for operation control of the engine 22 are output from the engine ECU 24 via the output port. The control signals output from the engine ECU 24 include a control signal to a throttle motor configured to regulate the position of the throttle valve, a control signal to a fuel injection valve and a control signal to an ignition coil integrated with an igniter, in addition to a variety of other signals.

The engine ECU 24 is connected with, the HVECU 70 via the respective communication ports to operate and the control the engine 22, in response to control signals from the HVECU 70 and to output data regarding the operating conditions of the engine 22 to the HVECU 70 as needed basis. The engine ECU 24 calculates a rotation speed of the crankshaft 26, a rotation speed Ne of the engine 22, based on the crank position θcr input from the crank position sensor 23.

The planetary gear 30 is configured as a single pinion-type planetary gear mechanism. The planetary gear 30 includes a sun gear that is connected with a rotor of the motor MG1. The planetary gear 30 also includes a ring gear that is connected with a driveshaft 36 which is coupled with drive wheels 38a and 38b via a differential gear 37. The planetary gear 30 further includes a carrier that is connected with the crankshaft 26 of the engine 22 via a damper 28.

The motor MG1 may be configured as, for example, a synchronous generator motor and includes the rotor that is connected with the sun gear of the planetary gear 30 as described above. The motor MG2 may also be configured as, for example, a synchronous generator motor and includes a rotor that is connected with the driveshaft 36. The inverters 41 and 42 are connected with the battery 50 via power lines 54. A motor electronic control unit (hereinafter, referred to as "motor ECU") 40 performs switching control of a plurality of switching elements (not shown) included in the respective inverters 41 and 42, so as to rotate and drive the motors MG1 and MG2.

The motor ECU 40 is configured as a CPU-based microprocessor and includes a ROM configured to store processing programs, a RAM configured to temporarily store data, input/output ports and a communication port, in addition to the CPU, although not being illustrated. Signals from various sensors required for drive control of the motors MG1 and MG2 are input into the motor ECU 40 via the input port. The signals input into the motor ECU 40 include, for example, rotational positions θm1 and θm2 from rotational position detection sensors 43 and 44 configured to detect the rotational positions of the rotors of the motors MG1 and MG2. The input signals also include phase currents from current sensors configured to detect electric currents flowing in respective phases of the motors MG1 and MG2.

The motor ECU 40 output, for example, switching control signals to the plurality of switching elements (not shown) included in the respective inverters 41 and 42. The motor ECU 40 is connected with the HVECU 70 via the respective communication ports to drive and control the motors MG1 and MG2, in response to control signals from the HVECU 70 and to output data regarding the driving conditions of the motors MG1 and MG2 to the HVECU 70 as needed basis. The motor ECU 40 calculates rotation speeds Nm1 and Nm2 of the respective motors MG1 and MG2, based on the rotational positions θm1 and θm2 of the respective rotors of the motors MG1 and MG2 input from the rotational position detection sensors 43 and 44.

The battery 50 is configured as, for example, a lithium ion rechargeable battery or a nickel metal hydride battery. This battery 50 is connected with the inverters 41 and 42 via the power lines 54 as described above. The battery 50 is under management of a battery electronic control unit (hereinafter referred tows "battery ECU") 52.

The battery ECU 52 is configured as a CPU-based microprocessor and includes a ROM configured to store processing programs, a RAM configured to temporarily store data, input/output ports and a communication port, in addition to the CPU, although not being illustrated. Signals from various sensors required for management of the battery 50 are input into the battery ECU 52 via the input port. The signals input into the battery ECU 52 include, for example, a battery voltage Vb from a voltage sensor 51a placed between terminals of the battery 50, a battery current Ib from a current sensor 51b mounted to an output terminal of the battery 50, and a battery temperature Tb from a temperature sensor 51c mounted to the battery 50.

The battery ECU 52 is connected with the HVECU 70 via the respective communication ports to output data regarding the conditions of the battery 50 to the HVECU 70 as needed basis. The battery ECU 52 calculates a state of charge SOC, based on an integrated value of the battery current Ib input from the current sensor 51b. The state of charge SOC denotes a ratio of the capacity of electric power dischargeable from the battery 50 to the overall capacity of the battery 50. The battery ECU 52 also calculates an input limit Win and an output limit Wout, based on the calculated state of charge SOC and the battery temperature Tb input from the temperature sensor 51c. The input limit Win and the output limit Wout denote maximum allowable powers that are respectively allowed to charge the battery 50 and to be discharged from the battery 50.

The HVECU 70 is configured as a CPU-based microprocessor and includes a ROM configured to store processing programs, a RAM configured to temporarily store data, input/output ports and a communication port, in addition to the CPU, although not being illustrated. Signals from various sensors are input into the HVECU 70 via the input port. The signals input into the HVECU 70 include, for example, an ignition signal from an ignition switch 80, a shift position SP from a shift position sensor 82 configured to detect an operating position of a shift lever 81, and a vehicle speed V from a vehicle speed sensor 88. The input signals also include an accelerator position Acc from an accelerator pedal position sensor 84 configured to detect a depression amount of an accelerator pedal 83 and a brake pedal position BP from a brake pedal position sensor 86 configured to detect a depression amount of a brake pedal 85.

The HVECU 70 is connected with the engine ECU 24, the motor ECU 40 and the battery ECU 52 via the respective communication ports to transmit various control signals and data to and from the engine ECU 24, the motor ECU 40 and the battery ECU 52, as described above.

The hybrid vehicle 20 of the embodiment having the above configuration may be driven in an HV drive mode or in an EV drive mode.

During a run in the HV drive mode, the HVECU 70 first sets a required torque Tr* that is required for driving (i.e., that is to be output to the driveshaft 36), based on the accelerator position Acc from the accelerator pedal position sensor 84 and the vehicle speed V from the vehicle speed sensor 88. The HVECU 70 subsequently calculates a driving power Pdrv* that is required for driving by multiplying the set required torque Tr* by a rotation speed Nr of the driveshaft 36. The rotation speed Nr of the driveshaft 36 used here may be the rotation speed Nm2 of the motor MG2 or may be a rotation speed obtained by multiplying the vehicle speed V by a conversion factor. The HVECU 70 then sets a required power Pe* that is required for the vehicle by subtracting a charge-discharge required power Pb* (which takes a positive value when the battery 50 is discharged) from the calculated driving power Pdrv*. The charge-discharge required power Pb* is set, based on a difference ΔSOC between the state of charge SOC of the battery 50 and a target state of charge SOC* as the control center, such as to decrease the absolute value of the difference ΔSOC. The HVECU 70 subsequently sets a target rotation speed Ne* and a target torque Te* of the engine 22 and torque commands Tm1* and Tm2* of the motors MG1 and MG2, such that the required power Pe* is output from the engine 22 and that the required torque Tr* is output to the driveshaft 36. The HVECU 70 sends the target rotation speed Ne* and the target torque Te* of the engine 22 to the engine ECU 24, while sending the torque commands Tm1* and Tm2* of the motors MG1 and MG2 to the motor ECU 40. The engine ECU 24 performs, for example, intake air flow control, fuel injection control and ignition control of the engine 22, such that the engine 22 is operated with the target rotation speed Ne* and the target torque Te*. The motor ECU 40 performs switching control of the respective transistors included in the inverters 41 and 42, such that the motors MG1 and MG2 are driven with the torque commands Tm1* and Tm2*.

During a run in the EV drive mode, the HVECU 70 first sets the required torque Tr*, based on the accelerator position Acc from the accelerator pedal position sensor 84 and the vehicle speed V from the vehicle speed sensor 88. The HVECU 70 subsequently sets a value 0 to the torque command Tm1* of the motor MG1, and sets the torque command Tm2* of the motor MG2, such that the required torque Tr* is output to the driveshaft 36. The HVECU 70 sends the torque commands Tm1* and Tm2* of the motors MG1 and MG2 to the motor ECU 40. The motor ECU 40 controls the inverters 41 and 42 as described above.

When the drive mode is shifted from the EV drive mode to the HV drive mode, the engine 22 is started. More specifically, the motor MG1 cranks the engine 22 by cooperative control of the HVECU 70, the engine ECU 24 and the motor ECU 40 to start the engine 22, and operation control (for example, fuel injection control and ignition control) of the engine 22 is started when the rotation speed Ne of the engine 22 becomes equal to or higher than a predetermined rotation speed (for example, 800 rpm, 900 rpm or 1000 rpm).

Figure 2:
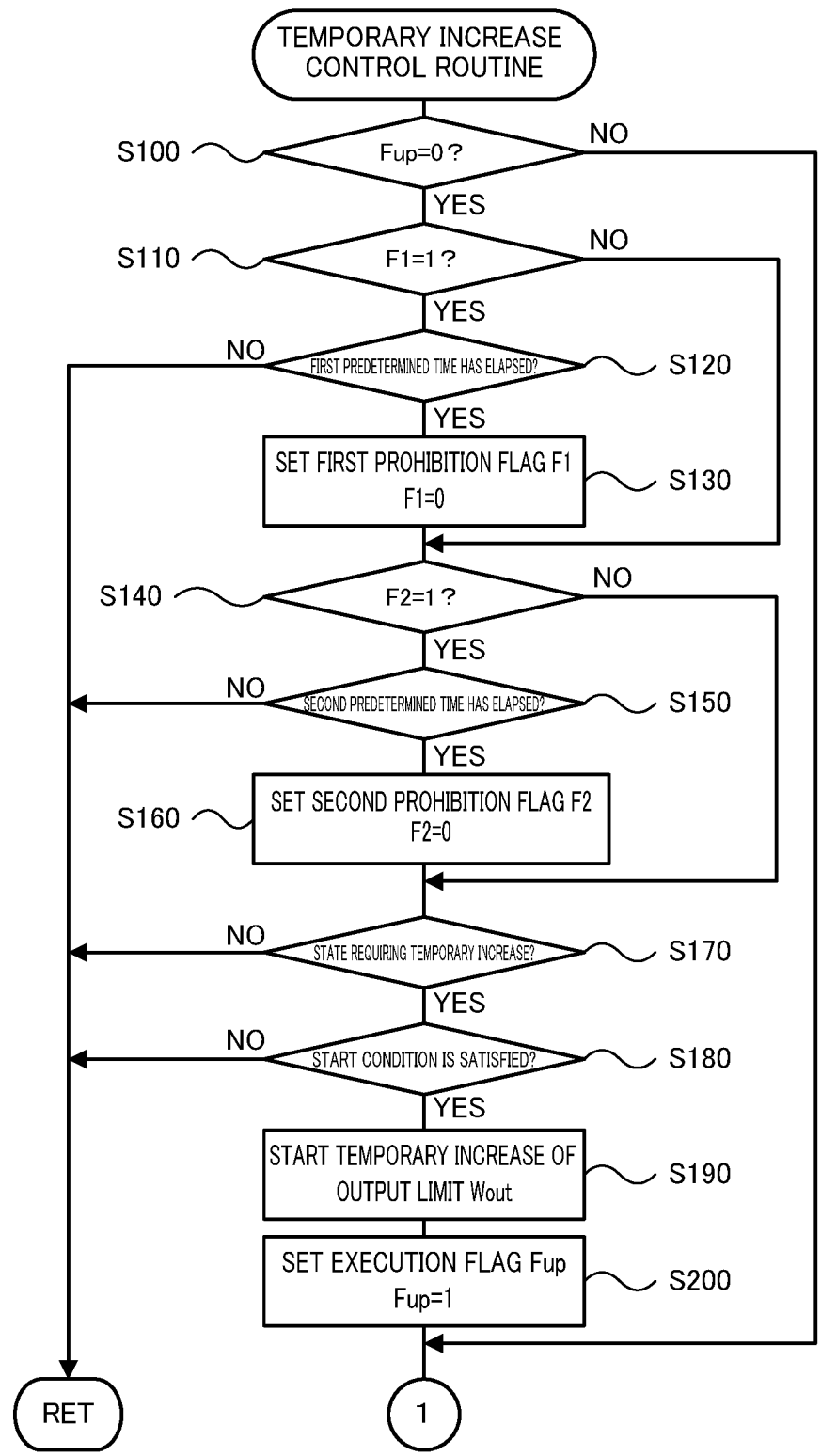
FIG. 2 is a flowchart showing part of one example of a temporary increase control routine performed by an HVECU.

The following describes operations of the hybrid vehicle 20 of the embodiment having the above configuration and more specifically series of operations to temporarily increase the output limit Wout of the battery 50. FIGS. 2 and 3 are flowcharts showing one example of a temporary increase control routine performed by the HVECU 70. This routine is performed repeatedly at predetermined time intervals (for example, at every several hundred msec or at every several sec).

When the temporary increase control routine is triggered, the HVECU 70 first determines whether a temporary increase execution flag Fup is set to a value 0 (step S100). The temporary increase execution flag Fup is a flag that is set to a value 1 when a temporary increase of the output limit Wout of the battery 50 is performed and that is set to a value 0 when the temporary increase of the output limit Wout of the battery 50 is terminated. The temporary increase execution flag Fup is set by this routine.

When it is determined at step S100 that the temporary increase execution flag Fup is set to the value 0, the HVECU 70 subsequently determines whether a first prohibition flag F1 is set to a value 1 (step S110). The first prohibition flag F1 is a flag that is set to a value 1 when the temporary increase of the output limit Wout of the battery 50 is terminated on satisfaction of a stop condition different from an ordinary termination condition and that is set to a value 0 when a first predetermined time has elapsed since termination of the temporary increase of the output limit Wout of the battery 50. The first prohibition flag F1 is set by this routine. When it is determined that the first prohibition flag F1 is set to the value 1, the HVECU 70 subsequently determines whether the first predetermined time has elapsed since termination of the temporary increase of the output limit Wout of the battery 50 (step S120). When it is determined that the first predetermined time has elapsed, the HVECU 70 sets the value 0 to the first prohibition flag F1 (step S130). The first predetermined time used here may be, for example, several ten seconds. The reason to wait for elapse of the first predetermined time, on satisfaction of the stop condition different from the ordinary termination condition, prior to the temporary increase of the output limit Wout of the battery 50 will be described later. When it is determined at step S120 that the first predetermined time has not yet elapsed, the HVECU 70 terminates this routine.

When it is determined at step S110 that the first prohibition flag F1 is set to the value 0 or after the first prohibition flag F1 is set to the value 0 at step S130, the HVECU 70 determines whether a second prohibition flag F2 is set to a value 1 (step S140). The second prohibition flag F2 is a flag that is set to a value 1 when the temporary increase of the output limit Wout of the battery 50 is terminated on satisfaction of the ordinary termination condition and that is set to a value 0 when a second predetermined time has elapsed since termination of the temporary increase of the output limit Wout of the battery 50. The second prohibition flag F2 is set by this routine. When it is determined that the second prohibition flag F2 is set to the value 1, the HVECU 70 subsequently determines whether the second predetermined time has elapsed since termination of the temporary increase of the output limit Wout of the battery 50 (step S150). When it is determined that the second predetermined time has elapsed, the HVECU 70 sets the value 0 to the second prohibition flag F2. (step S160). The second predetermined time used here is a shorter time period than the first predetermined time and may be, for example, several seconds. The reason to wait for elapse of the second predetermined time, on satisfaction of the ordinary termination condition, prior to the temporary increase of the output limit Wout of the battery 50 is to prevent continual temporary increases of the output limit Wout of the battery 50. When it is determined at step S150 that the second predetermined time has not yet elapsed, the HVECU 70 terminates this routine.

When it is determined at step S140 that the second prohibition flag F2 is set to the value 0 or after the second prohibition flag F2 is set to the value 0 at step S160, the HVECU 70 determines whether the current state is a state requiring a temporary increase of the output limit Wout of the battery 50 (step S170). The state requiring a temporary increase of the output limit Wout of the battery 50 is, for example, the state that the engine 22 is started or the state that the driver steps down the accelerator pedal 83. When it is determined that the current state is not the state requiring a temporary increase of the output limit Wout of the battery 50, the HVECU 70 terminates this routine.

When it is determined at step S170 that the current state is the state requiring a temporary increase of the output limit Wout of the battery 50, on the other hand, the HVECU 70 determines whether a start condition to start a temporary increase of the output limit Wout of the battery 50 is satisfied (step S180). The start condition is a condition that the battery 50 is in an ordinary working range and does not cause any trouble such as deterioration by a temporary increase of the output limit Wout of the battery 50. The start condition may be, for example, an AND condition of all a condition that the output limit Wout of the battery 50 is equal to or higher than a first predetermined power W1 that is higher than a lower limit of an ordinary power range, a condition that the voltage Vb of the battery 50 is equal to or higher than a first predetermined voltage V1 that is higher than a lower limit of an ordinary voltage range, a condition that the temperature Tb of the battery 50 is equal to or higher than a first predetermined temperature T1 that is higher than a lower limit of an ordinary temperature range, a condition that the state of charge SOC of the battery 50 is equal to or higher than a first predetermined ratio S1 that is higher than a lower limit of an ordinary ratio range, and a condition that the electric current Ib flowing in the battery 50 is equal to or lower than a first predetermined current I1 that is lower than an upper limit of an ordinary current range. When it is determined that the start condition is not satisfied, the HVECU 70 determines that the battery 50 is not in the ordinary working range and terminates this routine without performing a temporary increase of the output limit Wout of the battery 50.

When it is determined at step S180 that the start condition is satisfied, on the other hand, the HVECU 70 starts a temporary increase of the output limit Wout of the battery 50 (step S190) and sets the value 1 to the temporary increase execution flag Fup (step S200). The increment of the temporary increase of the output limit Wout of the battery 50 may be, for example, several kW.

When it is determined at step S100 that the temporary increase execution flag Fup is set to the value 1 or after the value 1 is set to the temporary increase execution flag Fup at step S200, the HVECU 70 determines whether a termination condition to terminate the temporary increase of the output limit Wout of the battery 50 is satisfied (step S210). The termination condition may be any one condition out of, for example, a condition that a predetermined increasing time (for example, several seconds) has elapsed since a start of the temporary increase of the output limit Wout of the battery 50 and a condition that the amount of power provided by an electric power (increased amount) exceeding the output limit Wout immediately before a temporary increase reaches a predetermined amount of power (for example, increased amount×predetermined increasing time/3 or increased amount×predetermined increasing time/2) since a start of the temporary increase of the output limit Wout of the battery 50. When the termination condition is satisfied, the HVECU 70 sets the value 1 to the second prohibition flag F2 (step S230), sets the value 0 to the temporary increase execution flag Fup (step S250), terminates the temporary increase of the output limit Wout of the battery 50 (step S260) and then terminates this routine. When the temporary increase of the output limit Wout of the battery 50 is terminated on satisfaction of the termination condition as described above, the second prohibition flag F2 is set to the value 1. Accordingly, a subsequent temporary increase of the output limit Wout of the battery 50 is not started until elapse of the second predetermined time since termination of the temporary increase (step S150).

When it is determined at step S210 that the termination condition is not satisfied, the HVECU 70 subsequently determines whether a stop condition to stop the temporary increase of the output limit Wout of the battery 50 is satisfied (step S220). The stop condition is different from the termination condition and may be, for example, an OR condition of all a condition that the output limit Wout of the battery 50 is lower than a second predetermined power W2 that is equal to or lower than the first predetermined power W1 (W2≤W1), a condition that the voltage Vb of the battery 50 is lower than a second predetermined voltage V2 that is equal to or lower than the first predetermined voltage V1 (V2≤V1), a condition that the temperature Tb of the battery 50 is lower than a second predetermined temperature T2 that is equal to or lower than the first predetermined temperature T1 (T2≤T1), a condition that the state of charge SOC of the battery 50 is lower than a second predetermined ratio S2 that is equal to or lower than the first predetermined ratio S1 (S2≤S1), and a condition that the electric current Ib flowing in the battery 50 is higher than a second predetermined current I2 that is equal to or higher than the first predetermined current I1 (I2≥I1). This stop condition stops a temporary increase of the output limit Wout of the battery 50, in response to a failure to satisfy the start condition, after the temporary increase of the output limit Wout is started on satisfaction of the start condition. In some embodiments, the stop condition is set with some hysteresis provided relative to the start condition. When feedback control of the output limit Wout is performed by the electric power from the battery 50, the voltage of the battery 50 or the electric current flowing in the battery 50, the stop condition may be a condition that the temporarily increased output limit Wout is revised downward by the feedback control. When it is determined that the stop condition is not satisfied, the HVECU 70 continues the temporary increase of the output limit Wout of the battery 50 and terminates this routine. When it is determined that the stop condition is satisfied, on the other hand, the HVECU 70 sets the value 1 to the first prohibition flag F1 (step S240), sets the value 0 to the temporary increase execution flag Fup (step S250), terminates the temporary increase of the output limit Wout of the battery 50 (step S260) and then terminates this routine.

When the temporary increase of the output limit Wout of the battery 50 is terminated on satisfaction of the stop condition as described above, the first prohibition flag F1 is set to the value 1. Accordingly, a subsequent temporary increase of the output limit Wout of the battery 50 is not started until elapse of the first predetermined time that is longer than the second predetermined time since termination of the temporary increase (step S120). Without taking into account the elapse of the first predetermined time, when the temporary increase of the output limit Wout of the battery 50 is terminated on satisfaction of the stop condition, the state of the battery 50 is more likely to immediately satisfy the stop condition even once the start condition is satisfied. This causes frequent repetition of a temporary increase of the output limit Wout of the battery 50 and its cancellation. With a view to suppressing such frequent repetition of a temporary increase of the output limit Wout of the battery 50 and its cancellation, the control procedure of the embodiment prohibits a subsequent temporary increase of the output limit Wout of the battery 50 from starting until elapse of the first predetermined time, which is longer than the second predetermined time employed in the case of termination of the temporary increase of the output limit Wout on satisfaction of the ordinary termination condition.

As described above, when the temporary increase of the output limit Wout of the battery 50 is terminated on satisfaction of the stop condition that is different from the ordinary termination condition, the hybrid vehicle 20 of the embodiment prohibits a subsequent temporary increase of the output limit Wout of the battery 50 from starting until elapse of the first predetermined time, which is longer than the second predetermined time employed in the case of termination of the temporary increase of the output limit Wout on satisfaction of the ordinary termination condition. This configuration suppresses frequent repetition of a temporary increase of the output limit Wout of the battery 50 and its cancellation.

When the temporary increase of the output limit Wout of the battery 50 is terminated on satisfaction of the ordinary termination condition, the hybrid vehicle 20 of the embodiment prohibits a subsequent temporary increase of the output limit Wout of the battery 50 from starting until elapse of the second predetermined time. A modification may immediately allow for a subsequent temporary increase of the output limit Wout of the battery 50 when the temporary increase of the output limit Wout of the battery 50 is terminated on satisfaction of the ordinary termination condition.

The hybrid vehicle 20 of the embodiment employs, as the start condition, the AND condition of all the condition that the output limit Wout of the battery 50 is equal to or higher than the first predetermined power W1 that is higher than the lower limit of the ordinary power range, the condition that the voltage Vb of the battery 50 is equal to or higher than the first predetermined voltage V1 that is higher than the lower limit of the ordinary voltage range, the condition that the temperature Tb of the battery 50 is equal to or higher than the first predetermined temperature T1 that is higher than the lower limit of the ordinary temperature range, the condition that the state of charge SOC of the battery 50 is equal to or higher than the first predetermined ratio S1 that is higher than the lower limit of the ordinary ratio range, and the condition, that the electric current Ib flowing in the battery 50 is equal to or lower than the first predetermined current I1 that is lower than the upper limit of the ordinary current range. According to a modification, however, the start condition may be an AND condition of part of these conditions or may be any different condition.

The hybrid vehicle 20 of the embodiment employs, as the stop condition, the OR condition of all the condition that the output limit Wout of the battery 50 is lower than the second predetermined power W2 that is equal to or lower than the first predetermined power W1 (W2≤W1), the condition that the voltage Vb of the battery 50 is lower than the second predetermined voltage V2 that is equal to or lower than the first predetermined voltage V1 (V2≤V1), the condition that the temperature Tb of the battery 50 is lower than the second predetermined temperature T2 that is equal to or lower than the first predetermined temperature T1 T1), the condition that the state of charge SOC of the battery 50 is lower than the second predetermined ratio S2 that is equal to or lower than the first predetermined ratio S1 (S2≤S1), and the condition that the electric current Ib flowing in the battery 50 is higher than the second predetermined current I2 that is equal to or higher than the first predetermined current I1 (I2≥I1). According to a modification, however, the stop condition may be an OR condition of part of these conditions or may be any different condition.

When the temporary increase of the output limit Wout of the battery 50 is terminated on satisfaction of the stop condition, the hybrid vehicle 20 of the embodiment prohibits a subsequent temporary increase of the output limit Wout of the battery 50 from starting until elapse of the first predetermined time. Even when the temporary increase of the output limit Wout of the battery 50 is terminated on satisfaction of the stop condition, however, in the case where the output limit Wout of the battery 50 imposes no limitation on the driving force, a modification may prohibit a subsequent temporary increase of the output limit Wout of the battery 50 from starting until elapse of the second predetermined time, as in the case of termination of the temporary increase of the output limit Wout on satisfaction of the ordinary termination condition. In other words, even in the case of termination of the temporary increase of the output limit Wout on satisfaction of the stop condition, as long as the temporarily increased output limit Wout imposes no limitation on the driving force, a subsequent temporary increase of the output limit Wout of the battery 50 is prohibited only for a shorter time period as in the case of termination of the temporary increase of the output limit Wout on satisfaction of the ordinary termination condition. The output limit Wout imposes a limitation on the driving force by limiting the torque command Tm1* of the motor MG1 and the torque command Tm2* of the motor MG2 or more typically by limiting the torque command Tm2* of the motor MG2 when the power output from the motor MG1 and from the motor MG2 exceeds the output limit Wout. In this case, a routine of FIG. 4 may be performed in place of the routine of FIG. 3. When it is determined at step S220 that the stop condition is satisfied, the HVECU 70 subsequently determines whether the temporarily increased output limit Wout imposes a limitation on the driving force (i.e., the torque command Tm2* of the motor MG2) during the temporary increase of the output limit Wout of the battery 50 (step S225). When it is determined that the temporarily increased output limit Wout imposes no limitation on the driving force, the HVECU 70 sets the value 1 to the second prohibition flag F2 (step S230), sets the value 0 to the temporary increase execution flag Fup (step S250), terminates the temporary increase of the output limit Wout of the battery 50 (step S260) and then terminates this routine. When it is determined that the temporarily increased output limit Wout imposes a limitation on the driving force, on the other hand, the HVECU 70 sets the value 1 to the first prohibition flag F1 (step S240), sets the value 0 to the temporary increase execution flag Fup (step S250), terminates the temporary increase of the output limit Wout of the battery 50 (step S260) and then terminates this routine. As described above, even when the temporary increase of the output limit Wout is terminated on satisfaction of the stop condition, as long as the temporarily increased output limit Wout imposes no limitation on the driving force, the temporary increase of the output limit Wout of the battery 50 is prohibited only for a shorter time period than the first predetermined time, because of the following reason. In the case where the temporarily increased output limit Wout imposes no limitation on the driving force, it is determinable that the driver does not require a significantly high power during the temporary increase of the output limit Wout. It is thus expected that the driver will not require a significantly high power during a subsequent temporary increase of the output limit Wout. Accordingly, there may be no need to wait for elapse of the first predetermined time before start of a subsequent temporary increase of the output limit Wout.

The hybrid vehicle 20 of the embodiment uses the battery 50 configured by a lithium ion rechargeable battery or a nickel metal hydride battery, as the power storage device. The power storage device used may, however, be any other device configured to accumulate electric power therein, for example, a capacitor.

Figure 5:
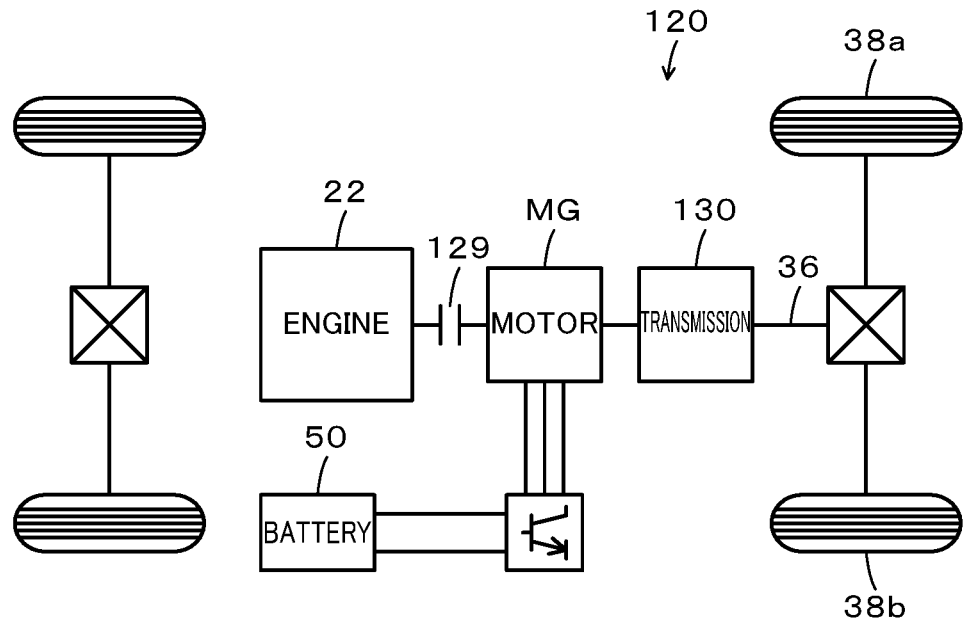
FIG. 5 is a configuration diagram illustrating the schematic configuration of another hybrid vehicle according to a modification.
Figure 6:
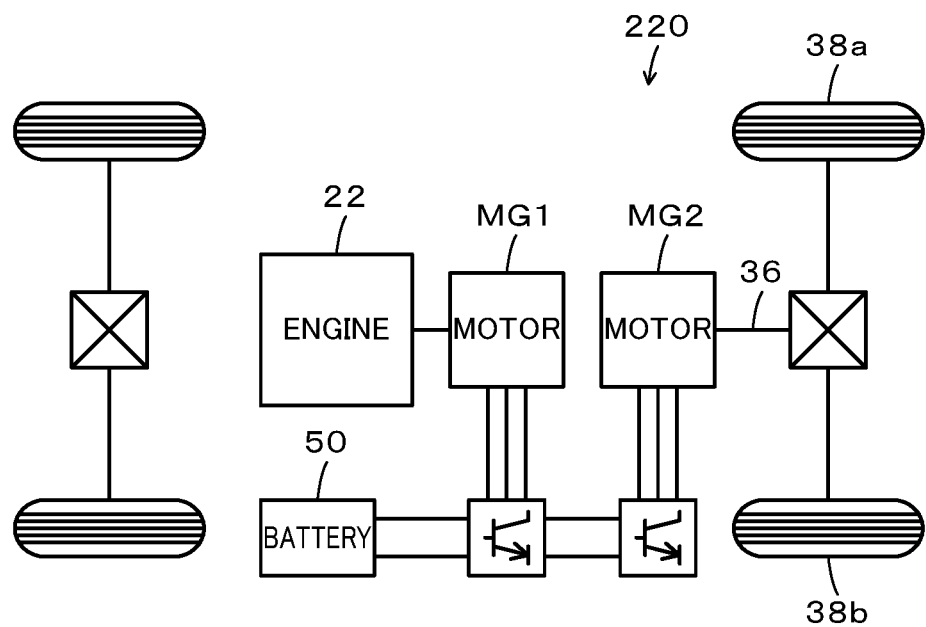
FIG. 6 is a configuration diagram illustrating the schematic configuration of another hybrid vehicle according to another modification.

The hybrid vehicle 20 of the embodiment is configured such that the engine 22 and the motor MG1 are connected via the planetary gear 30 with the driveshaft 36 coupled with the drive wheels 38a and 38b and that the motor MG2 is connected with the driveshaft 36. The present disclosure may, however, be applicable to a hybrid vehicle configured such that a motor MG capable of generating power is connected via a transmission 130 with a driveshaft 36 coupled with drive wheels 38a and 38b and that an engine 22 is connected via a clutch 129 with a rotating shaft of the motor MG, like a hybrid vehicle 120 of a modification shown in FIG. 5. The present disclosure may also be applicable to a series hybrid vehicle configured such that a motor MG2 for driving is connected with a driveshaft 36 coupled with drive wheels 38a and 38b and that a motor MG1 for power generation is connected with an output shaft of an engine 22, like a hybrid vehicle 220 of another modification shown in FIG. 6.

In the hybrid vehicle of this aspect, the predetermined start condition may include all a condition that the allowable discharge power is equal to or higher than a first predetermined power, a condition that voltage of the power storage device is equal to or higher than a first predetermined voltage, a condition that temperature of the power storage device is equal to or higher than a first predetermined temperature, a condition that state of charge of the power storage device is equal to or higher than a first predetermined ratio, a condition that electric current of the power storage device is equal to or lower than a first predetermined current, and a condition that a predetermined vehicle state desiring a temporary increase of the allowable discharge power is satisfied, the predetermined termination condition may include at least one of a condition that a predetermined increasing time has elapsed and a condition that an amount of power provided by an electric power exceeding the allowable discharge power immediately before a temporary increase reaches a predetermined amount of power, and the predetermined stop condition may include any one of a condition that the allowable discharge power is lower than a second predetermined power that is equal to or lower than the first predetermined power, a condition that the voltage of the power storage device is lower than a second predetermined voltage that is equal to or lower than the first predetermined voltage, a condition that the temperature of the power storage device is lower than a second predetermined temperature that is equal to or lower than the first predetermined temperature, a condition that the state of charge of the power storage device is lower than a second predetermined ratio that is equal to or lower than the first predetermined ratio, and a condition that the electric current of the power storage device is higher than a second predetermined current that is equal to or higher than the first predetermined current.

In the hybrid vehicle of another aspect, the predetermined stop condition may include a condition that the temporarily increased allowable discharge power is revised downward by feedback control using any one of the power, the voltage and the electric current of the power storage device. This configuration stops the temporary increase of the allowable discharge power (output limit) by revising the allowable discharge power downward by the feedback control using any one of the power, the voltage and the electric current of the power storage device.

In the hybrid vehicle of another aspect, when the temporarily increased allowable discharge power imposes no limitation on a driving force until termination of execution of the temporary increase control on satisfaction of the predetermined stop condition, the control device may not impose the prohibition of subsequent execution of the temporary increase control for the first predetermined time. When no limitation is imposed on the driving force, it is determinable that the driver does not require a significantly high power during execution of the temporary increase control. It is thus expected that the driver will not require a significantly high power during subsequent execution of the temporary increase control. There is accordingly no need to wait for the first predetermined time before a start of subsequent execution of the temporary increase control. This configuration suppresses execution of the temporary increase control from being prohibited unnecessarily.

In the hybrid vehicle of another aspect, when execution of the temporary increase control is terminated on satisfaction of the predetermined termination condition, the control device may prohibit subsequent execution of the temporary increase control until elapse of a second predetermined time that is shorter than the first predetermined time. This configuration suppresses frequent repetition of a temporary increase of the allowable discharge power (output limit) of the power storage device such as a battery and its cancellation, even when the temporary increase control is terminated on satisfaction of the predetermined termination condition, (ordinary termination condition).

The following describes the correspondence relationship between the primary components of the embodiment and the primary components of the disclosure described in Summary. The engine 22 of the embodiment corresponds to the "engine", the motor MG2 corresponds to the "motor", the battery 50 corresponds to the "power storage device", and the HVECU 70 corresponds to the "control device".

The correspondence relationship between the primary components of the embodiment and the primary components of the disclosure, regarding which the problem is described in Summary, should not be considered to limit the components of the disclosure, regarding which the problem is described in Summary, since the embodiment is only illustrative to specifically describes the aspects of the disclosure, regarding which the problem is described in Summary. In other words, the disclosure, regarding which the problem is described in Summary, should be interpreted on the basis of the description in the Summary, and the embodiment is only a specific example of the disclosure, regarding which the problem is described in Summary.

The aspect of the disclosure is described above with reference to the embodiment. The disclosure is, however, not limited to the above embodiment but various modifications and variations may be made to the embodiment without departing from the scope of the disclosure.

The technique of the disclosure is applicable to the manufacturing industries of the hybrid vehicle and so on

The invention claimed is:

1. A hybrid vehicle, comprising
   an engine configured to output power for driving;
   a motor configured to output power for driving;
   a power storage device configured to transmit electric power to and from the motor; and
   a control device configured to start execution of temporary increase control that temporarily increases an allowable discharge power, which is a maximum power dischargeable from the power storage device, on satisfaction of a predetermined start condition and to terminate execution of the temporary increase control on satisfaction of a predetermined termination condition, wherein on satisfaction of a predetermined stop condition that is different from the predetermined termination condition, during execution of the temporary increase control, the control device terminates execution of the temporary increase control and prohibits subsequent execution of the temporary increase control until elapse of a first predetermined time.

2. The hybrid vehicle according to claim 1,
wherein the predetermined start condition includes all of a condition that the allowable discharge power is equal to or higher than a first predetermined power, a condition that voltage of the power storage device is equal to or higher than a first predetermined voltage, a condition that temperature of the power storage device is equal to or higher than a first predetermined temperature, a condition that state of charge of the power storage device is equal to or higher than a first predetermined ratio, a condition that electric current of the power storage device is equal to or lower than a first predetermined current, and a condition that a predetermined vehicle state desiring a temporary increase of the allowable discharge power is satisfied,
the predetermined termination condition includes at least one of a condition that a predetermined increasing time has elapsed and a condition that an amount of power provided by an electric power exceeding the allowable discharge power immediately before a temporary increase reaches a predetermined amount of power, and
the predetermined stop condition includes any one of a condition that the allowable discharge power is lower than a second predetermined power that is equal to or lower than the first predetermined power, a condition that the voltage of the power storage device is lower than a second predetermined voltage that is equal to or lower than the first predetermined voltage, a condition that the temperature of the power storage device is lower than a second predetermined temperature that is equal to or lower than the first predetermined temperature, a condition that the state of charge of the power storage device is lower than a second predetermined ratio that is equal to or lower than the first predetermined ratio, and a condition that the electric current of the power storage device is higher than a second predetermined current that is equal to or higher than the first predetermined current.

3. The hybrid vehicle according to claim 2,
wherein the predetermined stop condition includes a condition that the temporarily increased allowable discharge power is revised downward by feedback control using any one of the power, the voltage and the electric current of the power storage device.

4. The hybrid vehicle according to claim 3,
wherein when the temporarily increased allowable discharge power imposes no limitation on a driving force until termination of execution of the temporary increase control on satisfaction of the predetermined stop condition, the control device does not impose the prohibition of subsequent execution of the temporary increase control for the first predetermined time.

5. The hybrid vehicle according to claim 3,
wherein when execution of the temporary increase control is terminated on satisfaction of the predetermined termination condition, the control device prohibits subsequent execution of the temporary increase control until elapse of the second predetermined time that is shorter than the first predetermined time.

6. The hybrid vehicle according to claim 2,
wherein when the temporarily increased allowable discharge power imposes no limitation on a driving force until termination of execution of the temporary increase control on satisfaction of the predetermined stop condition, the control device does not impose the prohibition of subsequent execution of the temporary increase control for the first predetermined time.

7. The hybrid vehicle according to claim 2,
wherein when execution of the temporary increase control is terminated on satisfaction of the predetermined termination condition, the control device prohibits subsequent execution of the temporary increase control until elapse of the second predetermined time that is shorter than the first predetermined time.

8. The hybrid vehicle according to claim 1,
wherein when the temporarily increased allowable discharge power imposes no limitation on a driving force until termination of execution of the temporary increase control on satisfaction of the predetermined stop condition, the control device does not impose the prohibition of subsequent execution of the temporary increase control for the first predetermined time.

9. The hybrid vehicle according to claim 8,
wherein when execution of the temporary increase control is terminated on satisfaction of the predetermined termination condition, the control device prohibits subsequent execution of the temporary increase control until elapse of the second predetermined time that is shorter than the first predetermined time.

10. The hybrid vehicle according to claim 1,
wherein when execution of the temporary increase control is terminated on satisfaction of the predetermined termination condition, the control device prohibits subsequent execution of the temporary increase control until elapse of a second predetermined time that is shorter than the first predetermined time.

* * * * *

UNITED STATES PATENT AND TRADEMARK OFFICE
CERTIFICATE OF CORRECTION

PATENT NO. : 10,894,539 B2
APPLICATION NO. : 16/197994
DATED : January 19, 2021
INVENTOR(S) : Keita Sato It is certified that error appears in the above-identified patent and that said Letters Patent is hereby corrected as shown below:

In the Specification

In Column 1, Line(s) 40, after "(output limit)", delete ",".

In Column 3, Line(s) 14, after "with", delete ",".

In Column 3, Line(s) 21, before "a rotation", insert --i.e.,--.

In Column 4, Line(s) 9, delete "tows" and insert --to as--, therefor.

In Column 9, Line(s) 42, after "condition", delete ",".

In Column 9, Line(s) 58, after "temperature T1", delete "T1)" and insert --(T2≤T1)--, therefor.

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*